United States Patent Office 3,032,484

Patented May 1, 1962

3,032,484

JET PLATING METHOD OF MANUFACTURE OF MICRO-ALLOY TRANSISTORS

Donald P. Sanders, Lansdale, Pa., assignor, by mesne assignments, to Philco Corporation, Philadelphia, Pa., a corporation of Delaware No Drawing. Filed Nov. 12, 1959, Ser. No. 852,162
2 Claims. (Cl. 204—15)

This invention relates to the jet plating process of manufacture of micro-alloy transistors, and more particularly to the plating solutions employed in the process.

For the present purpose, it will suffice to refer only generally to the method of manufacture of such transistors. For a detailed description reference may be had to the copending application of R. A. Williams Serial No. 669,852, filed July 3, 1957, and now abandoned.

In the manufacture of micro-alloy transistors, an indium emitter electrode is jet plated in the form of a small dot onto a germanium wafer by directing a stream of an electrolytic indium salt solution against a surface of the wafer and passing current through the stream to said surface. The electroplating operation may be carried out as described in the article by Tiley and Williams at page 1706 of the Proceedings of the IRE for December 1953. Then a connecting lead in the form of a whisker is soldered to said electrode, and at the same time the electrode is micro-alloyed with the germanium, utilizing for the latter purposes an indium soldering alloy containing gallium.

Usually the collector electrode is jet plated at the same time as the emitter by directing jets or streams against opposite sides of the germanium wafer, and a connecting whisker is soldered to the collector after the micro-alloying of the emitter.

While the jet plating method is admirably suited for the manufacture of micro-alloy transistors, in practice the percentage of rejects has tended to be high. Two principal requirements which must be met are satisfactory beta and satisfactory tensional strength of the emitter whisker attachment. Experimentation has shown that the gallium in the indium soldering alloy, while essential to effect the micro-alloying of the emitter electrode with the germanium, tends adversely to affect the adhesion of the whisker and the emitter electrode.

Other problems encountered in the manufacture of micro-alloy transistors are "ball-up" (contraction of an electrode into a ball) and the formation of so-called "islands" during the micro-alloying operation.

The principal object of the present invention is to provide a satisfactory solution of these problems and to improve the jet plating process with a view toward substantial reduction of the number of rejects in the manufacture of micro-alloy transistors.

Heretofore the presence of any impurity or contaminant in the indium plating solution has been deemed undesirable, as it has seemed logical that any contaminant would tend adversely to affect the jet plating process and the transistors produced thereby, thus tending to increase the number of rejects. I have discovered, however, that if the jet plating of the emitter electrode is conducted with an indium plating solution containing a certain amount of iron, the above-mentioned adverse effect of the gallium is overcome and at the same time good beta is achieved. While I do not wish to be bound by any theory, it would appear that the iron overcomes a weakening effect of the gallium upon the interface tension of the joined elements. However, it is important that the iron concentration be controlled so as to achieve good beta, as an excess of effective iron in the solution will cause intolerable decrease of beta.

An improvement provided by this invention therefore consists in conducting the jet plating of the emitter electrode with an indium plating solution containing a quantity of iron effective to overcome the adverse effect of the gallium and at the same time permit achievement of good beta. Extensive experimentation has shown that for best results the quantity of iron should be only a trace, e.g. in the case of an indium sulphate solution as hereinafter described where the plated electrode diameter is within the range of about 4 to 7 mils, the iron content preferably is within the range 0.3 to 0.5 part of iron per million parts of the plating solution. However, substantially larger quantities of iron may be present—even quantities tending to decrease the beta of the transistor to an unacceptable value—if a suitable complexing agent is added to decrease the quantity of effective iron sufficiently to maintain acceptable beta while still overcoming the adverse effect of the gallium.

I have also discovered that iron is effective to prevent the above-mentioned "ball-up" distortion of an electrode. Thus if the collector electrode tends to be distorted due to heat conducted through the germanium blank during micro-alloying of the emitter electrode, a quantity of iron such as above mentioned may be added to the plating solution for the collector electrode. While it is not definitely known why the iron is effective to prevent "ball-up," it is believed that it may be due to modification of the surface tension of the plated metal and/or the adhesion thereof to the germanium.

Actually in the case of the collector electrode a greater concentration of iron can be employed, since of course this will have no effect upon the beta. However it is usually more convenient to employ the same solution for both electrodes.

I have also discovered that the addition of iron helps to prevent "island" formation, i.e. small pockets or areas of unmicro-alloyed germanium surface existing within and surrounded by the areas of micro-alloyed germanium which constitutes the active emitter region.

A plating solution in accordance with this invention may be prepared by the addition of a prepared iron solution in the course of preparation of the usual plating solution. In the exemplary procedure described below an indium sulfate plating solution is employed containing 0.724 gram $In_2(SO_4)_3$/ml. which may be prepared from commercially available 0.965 gram $In_2(SO_4)_3$/ml. solution as follows: Pour the contents of a 30-fluid ounce bottle of 0.965 gram $In_2(SO_4)_3$/ml. solution into a clean, dry 2000-ml. graduated cylinder. Note the volume of the solution to the nearest 10 ml. Multiply that volume by 4/3 (the ratio of 0.965 gram $In_2(SO_4)_3$/ml. to 0.724 gram $In_2(SO_4)_3$/ml. This product is the volume to which the 0.965 gram $In_2(SO_4)_3$/ml. solution is to be diluted to make 0.724 gram $In_2(SO_4)_3$/ml. solution. For example, if the 0.965 gram $In_2(SO_4)_3$/ml. solution has a volume of 890 ml., 890 ml. times 4/3 equals 1190 ml. Add distilled or deionized water to the graduated cylinder to bring the volume of solution up to the calculated volume. Transfer the 0.724 gram $In_2(SO_4)_3$/ml. solution to a clean, dry 2-liter narrow-mouth screw-cap bottle.

The iron solution for use in the indium sulfate plating solution may be prepared as follows: add 8.62 grams of ferric ammonium sulfate to a clean beaker containing 700–800 ml. of deionized water; add 8 ml. $H_2SO_4$ acid and dilute to 1 liter.

The plating solution may be prepared, utilizing the above prepared solutions, as follows: Add about 15 liters of distilled or deionized water to a clear 5 gallon Pyrex bottle. Add 192.6 grams of ammonium chloride to the bottle. Mix thoroughly by bubbling nitrogen slowly through the solution for 15 minutes. Using a 500 ml. graduated cylinder, add 385 ml. of the indium sulfate solution containing 0.724 gram $In_2(SO_4)_3$/ml. Stir for 10 minutes by bubbling nitrogen through the solution. Then add 25 ml. of concentrated ammonium hydroxide to the Pyrex bottle, using a 50 ml. graduated cylinder. Nitrogen should be bubbled through the solution during addition of the ammonium hydroxide to stir the solution, thus minimizing indium hydroxide formation. The purpose of the ammonium hydroxide is to neutralize the free acid present in indium sulfate solutions. Add 5.4 ml. of the iron solution. This increases the iron concentration of the plating solution by 0.3 part per million which normally will result in very slightly more than 0.3 p.p.m. of iron in the plating solution. Dilute to the 18-liter calibration mark with distilled or deionized water and stir for 10 minutes by bubbling nitrogen through the solution. Then determine the pH of the solution to determine whether it is within the range 2.7 to 3.0 which is the acceptable range. If the pH of the solution is too low, add more concentrated ammonium hydroxide to bring the pH into the acceptable range. If the pH is too high it should be lowered by the addition of concentrated hydrochloric acid. After each addition of ammonium hydroxide, or of hydrochloric acid, the solution should be stirred by bubbling nitrogen for at least 10 minutes before another pH reading is taken.

While in the case of an indium sulfate solution as above described used to plate electrodes of 4 to 7 mils diameter the preferred iron concentration is 0.3 to 0.5 part of iron per million parts of the plating solution, as previously stated a greater quantity of iron may be present if a complexing agent is added to decrease the quantity of effective iron sufficiently to maintain acceptable beta. To demonstrate this, two groups of transistors were manufactured, using for one group a plating solution containing 0.3 p.p.m. iron and for the other group a plating solution containing 70 p.p.m. iron complexed with ethylenediaminetetraacetic acid. The average beta of the first group was 45.4, while that of the second group was 20.8 which is acceptable at least for some uses even though it is less than half the average beta of the first group.

In another test two groups of transistors were manufactured, using for one group a plating solution containing 0.3 p.p.m. iron and for the other group a plating solution containing 70 p.p.m. iron complexed with Versenex 80. The average beta of the first group was 35.6, while that of the second group was 15 which is acceptable at least for some uses even though it is less than half the average beta of the first group.

In each of the above-mentioned tests, the complexing agent was added in a 1.65 to 1.00 ratio in excess of the stoichiometric quantity calculated to complex the iron content.

In still another test two groups of transistors were manufactured, using for one group a plating solution containing 0.3 p.p.m. iron and for the other group a plating solution containing 70 p.p.m. iron without complexing. The average beta of the first group was 50.8, while that of the second group was 3.02, showing that the excessive iron without complexing caused drastic decrease of beta to such a low value as to render the transistors useless.

Experimental use of this invention has shown that it is very effective in increasing the yield in the manufacture of micro-alloy transistors. Moreover, it improves the uniformity of the transistors. Tests have shown that by the use of this invention satisfactory beta and satisfactory emitter whisker tensional strength are achieved over a substantial range of whisker plating voltages, and that the invention also helps to prevent "ball-up" and "island" formation.

While the invention has been described herein in its application to an indium sulfate plating solution, it is not limited thereto but is applicable to any indium salt plating solution. Moreover the optimum iron range may be different for different solutions and plating conditions. It will be understood therefore that the disclosure herein is not intended to limit the invention.

I claim:

1. In the manufacture of micro-alloy transistors involving jet plating of indium electrodes onto germanium blanks by directing a stream of electrolyte comprising an aqueous solution of an indium salt against the germanium surface onto which the indium is to be applied and passing electric current through the electrolyte stream to said surface, and also involving soldering of a connecting whisker to the emitter electrode and concomitant micro-alloying of the emitter electrode with the germanium utilizing an indium soldering alloy containing gallium, which tends adversely to affect the adhesion of said whisker and said emitter electrode and also tends to cause deformation of at least one electrode, the improvement which consists in conducting the jet plating with an aqueous indium plating solution containing a predetermined small quantity of iron as ions sufficient substantially to prevent the adverse effects of the micro-alloying operation.

2. In the manufacture of micro-alloy transistors involving jet plating of indium electrodes onto germanium blanks by directing a stream of electrolyte comprising an aqueous solution of an indium salt against the germanium surface onto which the indium is to be applied and passing electric current through the electrolyte stream to said surface, and also involving soldering of a connecting whisker to the emitter electrode and concomitant micro-alloying of the emitter electrode with the germanium utilizing an indium soldering alloy containing gallium, which tends adversely to affect the adhesion of said whisker and said emitter electrode and also tends to cause deformation of at least one electrode, the improvement which consists in conducting the jet plating with an aqueous indium plating solution containing a quantity of iron as ions within the range 0.3 to 0.5 part of iron per million parts of plating solution, whereby substantially to prevent the adverse effects of the micro-alloying operation.

References Cited in the file of this patent

UNITED STATES PATENTS

| | | |
|---|---|---|
| 2,504,628 | Benzer | Apr. 18, 1950 |
| 2,530,110 | Woodyard | Nov. 14, 1950 |
| 2,871,377 | Tyler et al. | Jan. 27, 1959 |
| 2,873,232 | Zimmerman | Feb. 10, 1959 |